Sept. 24, 1968
H. E. MYERS
3,402,569
REFRIGERATED BAIT CONTAINER
Filed June 29, 1967
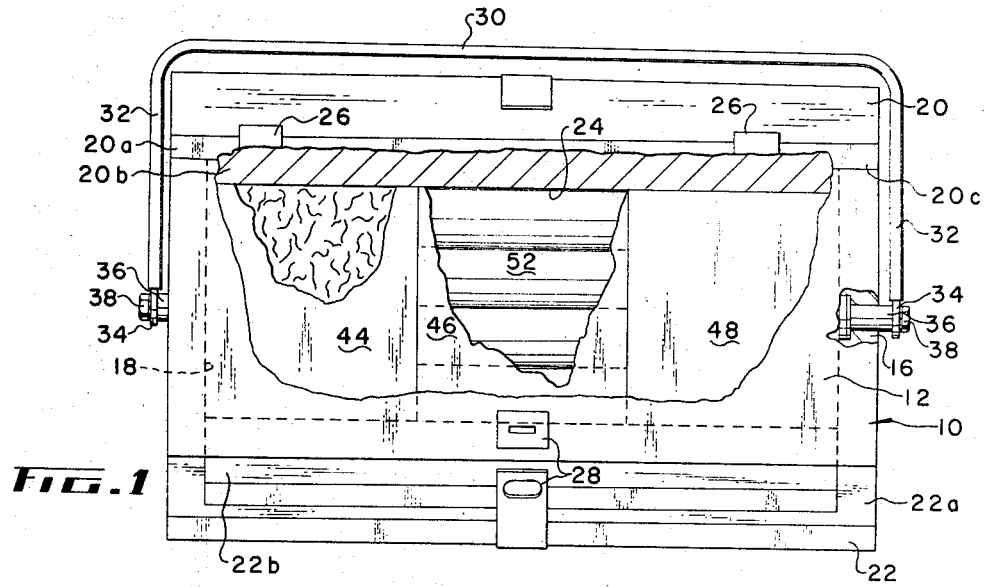

United States Patent Office 3,402,569
        Patented Sept. 24, 1968

3,402,569
REFRIGERATED BAIT CONTAINER
Harold E. Myers, Bowen, Ill.; Bernice I. Myers, administrator of the estate of Harold E. Myers, deceased
Filed June 29, 1967, Ser. No. 649,913
6 Claims. (Cl. 62—457)

ABSTRACT OF THE DISCLOSURE

A portable container assembly for worms and other types of live fish bait comprising an exterior container made of lightweight thermal insulating material and plural interior containers removably disposed inside the exterior container in side-to-side relation to one another. The exterior and interior containers have top and bottom closure members which are openable to expose the bait contents of the interior containers; the bottom closure members being accessible for opening upon inverting the container assembly about a carrying handle pivotally attached to opposite end walls of the exterior container. One or more of the interior containers may be supplied with a cooling agent for maintaining the live bait contents of adjacent interior containers at an optimum preserving temperature below ambient temperature.

Background of the invention

Most species of worms used in the live condition for fish bait are adversely affected by exposure to ambient heat levels encountered under usual fishing conditions; and, as a consequence, such worms either die or lose their vigor and bait value within a relatively short time. Crude bait containers such as open cans or cartons do not provide a suitable habitat for live worms even when filled with moistened worm bedding because warm air and direct sunlight rapidly dry and heat the bedding and the worms. Heretofore, it has been proposed in U.S. Patent 2,673,454, issued to Gallie et al., to provide an insulated container having separate receptacles for ice and for worms so that the latter are maintained at an optimum preserving temperature over a substantial period. The Gallie et al. patent discloses an exterior insulating container having one removable lid at the top opening thereof which provides access to a single worm receptacle which is cooled by ice disposed in an underlying receptacle.

It is well known by fishermen that worms quickly migrate to the bottom of a container of worm bedding and that the bedding must be lifted or pushed aside to expose the worms each time rebaiting is required. Such manual agitation of the bedding injuries the worms, causes spillage and loss of the bedding, and soils the hands. Moreover, such agitation of the worms and the bedding exposes the same to ambient temperature and circulating air thereby accelerating the aforementioned deleterious heating and drying of the worms and bedding. Furthermore, considerable time may be expended in locating the worms and in avoiding spillage of the bedding thereby unduly protracting the rebaiting process and reducing the opportunities for catching fish during those daily periods when the fish are feeding.

It is an object of my invention to provide an improved live worm container which will preserve the worms over a long period and which will render the worms readily accessible in spite of their tendency to migrate to the container bottom.

Summary of the invention

My invention resides in a bait container comprising an exterior insulating container having disposed therein two or more interior containers made of good heat conducting material. The exterior container has top and bottom covers which are respectively openable when the container is inverted. The interior containers have top and bottom covers which can be opened when the overlying top or bottom cover of the exterior container is opened. The interior containers are discrete from one another and are preferably in side-to-side contact with one another for good heat conductivity one to the other. In one application of my invention one of the interior containers is filled with a cooling agent, such as frozen brine cans, and one or more adjacent and touching interior containers is filled with worms and suitable bedding. The transfer of heat from the worm containers to the cooling container cools the worms to an optimum preserving temperature; and, the insulating property of the exterior container maintains a cooled condition throughout the inside of the container assembly.

A particularly advantageous feature of my invention is accomplished by the provision of the aforementioned top and bottom covers for the exterior and interior containers. Thus the container assembly is alternately openable at its top or bottom; and, by simply inverting the same just prior to opening a cover, the worms which have migrated to the bottom of the interior container will be completely exposed and accessible. Not only is rebaiting thereby made more rapid and pleasant, but the worms and bedding are maintained in good condition due to minimized agitation thereof. Moreover, the container covers may be quickly reclosed thereby preventing any appreciable reheating of the container interiors and their contents.

These and other objects and advantages of my invention will become apparent upon reading the following description and claims in connection with the attached drawings in which:

FIG. 1 is a side view of one embodiment of the invention having portions of the exterior and interior containers broken away and showing the exterior top and bottom covers in the open condition;

FIG. 2 is a top view with a portion of the top cover broken away;

FIG. 3 is a perspective view of the interior containers in spaced relationship and showing various open and closed conditions of the container lids; and FIG. 4 is a fragmentary sectional view showing another embodiment of the invention having a sliding closure for the exterior container.

As shown in FIGS. 1 and 2, an exterior container, indicated in its entirety by numeral 10, comprises side walls 12 and 14, end walls 16 and 18, and closures 20 and 22, hereafter referred to as top closure 20 and bottom closure 22. These walls and closures coact to define an interior cavity 24 of container 10 which is accessible upon opening of either of the closures 20 or 22. Preferably, the aforedescribed structural members of the container 10 are made of a lightweight insulating material such as foam or expanded plastic. The thickness of these structural members should be great enough to afford resistance to denting and breaking upon impact and to afford enough strength in section to coact effectively with various fittings and fasteners to be described. The closures 20 and 22 are relieved about their peripheries to provide recessed shoulders 20a and 22a and projecting center portions 20b and 22b, the latter fitting in substantially airtight relation in the top and bottom openings defined by the side walls 12 and 14 and the end walls 16 and 18 when the closures are fully shut. As best seen in FIG. 1, the closures are mounted on and secured to the opposite side walls to swing open about one side edge thereof. Thus top closure 20 swings open and closed about an edge 20c of the shoulder 20a which bears upon the top surface of side wall 12 and bottom closure 22 swings open and closed in a similar manner about the bottom surface of the opposite side wall 14. Hinges 26, made of suitably strong and flexible material, join the closures to the side walls for a relative swinging of the closures; and, hasps 28 have interacting portions suitably secured to the closures and the side walls, respectively, to releasably lock the closures in the closed condition.

A U-shaped carrying handle 30 extends the full length of the exterior container 10 and has downwardly bent portions 32 which are parallel with the end walls 16 and 18. Flat apertured ends 34 of the handle 30 receive pivot pins 36 which project laterally from end walls and are secured in the end walls by suitable fasteners 38. The handle 30 is dimensioned so that the exterior container 10 may be freely roated about the pivot pins 36 when the closures 20 and 22 are shut.

FIG. 4 shows another type of closure which is slidably mounted with respect to the top and bottom of the exterior container 10. The side walls 12 and 14 are grooved to form guide channels for the projecting tongues 40 of the slidable cover 42. This type of cover eliminates the need for hinges and hasps required in the cover construction shown in FIGS. 1 and 2. From the following description it will also be appreciated that a slidable cover 40 need be opened only sufficiently to gain access to one end of the interior cavity 24 thereby minimizing the loss of coolness from the container 10.

In a preferred form of my invention, three interior containers 44, 46 and 48 are disposed inside the exterior container cavity 24 thereby defining plural compartments within the exterior container 10. As shown in FIG. 3, the containers 44, 46 and 48 are provided with top and bottom access lids 44a, 44b, 46a, 46b, 48a and 48b, respectively, which are hinged to swing upward or downwardly, as the case may be, about one edge thereof. I prefer that the interior containers be of the same size and shape so that they may be positioned interchangeably within the cavity 24. In the side-to-side condition shown in FIGS. 1 and 2, the interior containers have a combined length which is approximately the same as the length of the cavity 24. The height and width of each container is approximately the same as that of the cavity 24 so that with the containers in place and with the closures 20 and 22 shut, the containers 44, 46 and 48 fit snugly in the cavity 24 and are held in substantial movement in any direction.

The containers 44, 46 and 48 are preferably constructed of good conducting material such as thin aluminum; however, to reduce costs, a plastic material can be used. One or more of the containers may be provided with screen covered openings in the side or sides abutting another container in order to permit maximum heat exchange with its contents. Container 44 is shown with a screen covered opening 50 in one side thereof.

While I have shown and described an assembly having three like-sized interior compartments, it will be understood that the benefits of this invention can be attained with two or more interior containers and that the individual containers may be of different sizes so long as they occupy substantially the entire volume of cavity 24 and interfit within the cavity 24 thereby to prevent dead air spaces between the containers.

The aforedescribed embodiment of my novel bait container is prepared for use by filling the middle interior container 46 with a suitable cooling agent such as frozen brine cans 52. The containers can be made watertight if desired so that ice may be substituted for the brine cans 52. The outer containers 44 and 48 are filled with worm bedding of any suitable type and a supply of worms is placed therein. One advantage of using plural worm containers 44 and 48 is that different types of worms can be made available without their intermingling. After the worms are in place and the closures 20 and 22 are shut, the worms and bedding will be quickly cooled due to the transfer of heat from containers 44 and 48 to the cooling agent inside container 46. It has been observed that the worms in containers 44 and 48 will position themselves in the bedding relative to the coolest container wall for their maximum comfort; therefore, there is little risk of damage to the worms due to low temperature conditions adjacent the cooling agent container 46.

The handle 30 not only provides a convenient means for carrying the bait container from place to place but also permits pivoting of the exterior container 10 so that either the top closure 20 or the bottom closure 22 can be opened. This feature of my invention makes it possible to invert the worm container 44 and 48 thereby to have ready access to the worms therein which tend to migrate rapidly to the bottom of the containers. Thus, when rebaiting is necessary, the container assembly is lifted by handle 30 and is turned through 180° from the position shown in FIG. 1 so that the bottom closure 22 is then on top. The worms which have gathered at the bottom interior container 44, for example, are then on top and are accessible merely by opening the closure 22 and the lid 44b of container 44. If a slidable closure 42 is employed, it need be opened only far enough to permit lifting of the interior container lid 44b thereby minimizing the entrance of warm exterior air into the inside of container 10.

Other important advantages are attainable due to the compartmentization of the inside of container 10 through the use of individual interior containers 44, 46 and 48. For example, other types of live bait such as crickets can be kept in one interior container at the same time worms are maintained in a cooled condition in another container. Since crickets could be injured if they become too cold, the cooling agent may be placed in a container at one end of the cavity 24 with the worm container disposed between the cooling agent container and the cricket container. Food and beverages which require refrigeration can be kept in a clean and palatable condition inside one of the interior containers thereby eliminating the need for a second cooling box for this purpose. If the supply of worms in a given interior container is not exhausted, that particular interior container can be easily removed from the exterior container 10 and placed in a domestic refrigerator device until needed.

It will be appreciated that the interior containers 44, 46 and 48 serve as liners for the cavity 24 and that the rigidity of the interior containers enhances the durability of the low-strength insulating material comprising the exterior container. Since the exterior and interior containers open at both ends they are easy to maintain in a clean condition.

It will be understood by those skilled in the design and manufacture of bait boxes of the type disclosed herein that the above description and drawings comprehend only a general and preferred embodiment of my invention and that various changes in construction, materials, dimensions, and arrangement of components may be made without departing from the spirit of the invention as set forth in the appended claims.

Having fully described the invention, I claim:

1. A live bait container assembly comprising:
    (a) exterior container means having a cavity therein defined by opposed walls and independently openable top and bottom lid means;
    (b) plural interior container means disposed in said cavity;
    (c) said interior container means having opposed walls and independently openable top and bottom lid means; and
    (d) the lid means of said exterior container means overlying the lid means of said interior container means.

2. The invention defined in claim 1 wherein:
    (a) said exterior container means is made from thermal insulating material; and
    (b) said interior container means are made from thermal conducting material.

3. The invention defined in claim 2 wherein:
(a) said interior container means comprise first and second containers spaced apart by a third container;
(b) said third container has a refrigerating agent disposed therein; and
(c) said first and second containers are in heat transferring relation to said third container whereby the interiors of said first and second containers are cooled.

4. The invention defined in claim 1 wherein: said interior container means substantially fill said cavity of said exterior container means whereby said interior container means are restrained against movement and said lid means therefor are maintained closed.

5. The invention defined in claim 4 wherein: said interior containers are of substantially identical size and shape and are interchangeably positionable in said cavity.

6. The invention defined in claim 1 together with:
(a) handle means for carrying said container assembly from place to place;
(b) said handle means being pivotally secured to opposed walls of said exterior container whereby said container assembly is rotatable with respect to said handle to reverse the positions of said top and bottom closure means.

References Cited

UNITED STATES PATENTS

| | | | |
|---|---|---|---|
| 111,950 | 2/1871 | Lester | 62—46 |
| 1,862,491 | 6/1932 | Hessenbruch | 62—464 |
| 2,078,129 | 4/1937 | Bois | 62—9 |
| 2,225,792 | 12/1940 | Nicholls | 62—457 |
| 2,673,454 | 3/1954 | Gallie et al. | 62—29 |
| 3,236,206 | 2/1966 | Willinger | 62—457 |
| 3,280,586 | 10/1966 | Funakoshi | 62—45 |
| 3,338,068 | 8/1967 | Piker | 62—45 |

WILLIAM J. WYE, *Primary Examiner.*